United States Patent [19]
Belart

[11] Patent Number: 4,592,599
[45] Date of Patent: Jun. 3, 1986

[54] HYDRAULIC BRAKE SYSTEM

[75] Inventor: Juan Belart, Walldorf, Fed. Rep. of Germany

[73] Assignee: ITT Industries, Inc., New York, N.Y.

[21] Appl. No.: 616,552

[22] Filed: Jun. 1, 1984

[30] Foreign Application Priority Data

Jun. 9, 1983 [DE] Fed. Rep. of Germany ....... 3320822

[51] Int. Cl.$^4$ .............................................. B60T 8/00
[52] U.S. Cl. ..................................... 303/119; 60/560; 60/563; 60/591
[58] Field of Search ................. 303/111, 114, 119, 95, 303/96, 105, 106; 60/560, 563, 564, 591; 188/182

[56] References Cited

U.S. PATENT DOCUMENTS

| | | | |
|---|---|---|---|
| 3,761,140 | 9/1973 | Lewis et al. | 303/114 |
| 3,972,382 | 8/1976 | Takayama et al. | 303/114 X |
| 4,022,514 | 5/1977 | Kondo et al. | 303/119 X |
| 4,071,283 | 1/1978 | Van House | 303/114 |
| 4,449,369 | 5/1984 | Dauvergne | 60/563 X |
| 4,483,114 | 11/1984 | Steffes | 60/591 X |

FOREIGN PATENT DOCUMENTS

2065810 7/1981 United Kingdom ................ 303/114

*Primary Examiner*—Bruce H. Stoner, Jr.
*Assistant Examiner*—Robert J. Oberleitner
*Attorney, Agent, or Firm*—James B. Raden; William J. Michals

[57] ABSTRACT

This invention relates to a hydraulic brake system for automotive vehicle with a master cylinder (2) and with a hydraulic power booster (1) connected upstream of the master cylinder (2) and having a pressure chamber (4) in which an auxiliary pressure depending on the actuating force (F) may be modulated via a pedal-operable brake valve (7). Wheel brakes (51, 53) of a first brake circuit are connected at the pressure chamber (4), wheel brakes (50, 52) of a second brake circuit being connected at the master cylinder (2). The braking pressure active in the wheel brakes (50 through 53) is controllable by valve members (39, 54 through 59) controllable in dependence on the slip. In case of control, a hydraulic communication will be established between the pressure chamber (4) of a hydraulic power booster (1) and the master cylinder. It is suggested to provide a valve device (49) which in case of control may be switched over and by means of which two wheel brakes (52, 53) of one axle may be connected with each other. The wheel brakes of one brake circuit each are arranged at the vehicle so as to diagonally oppose each other. By using such means a hydraulic brake system is realizable which in the case of normal brake actions has a diagonal brake circuit allotment and in which in case of control caused by slip detection two wheel brakes (52, 53) of one vehicle axle are connected with each other, the brake system thus working with a Y-brake circuit allotment during brake slip control.

5 Claims, 1 Drawing Figure

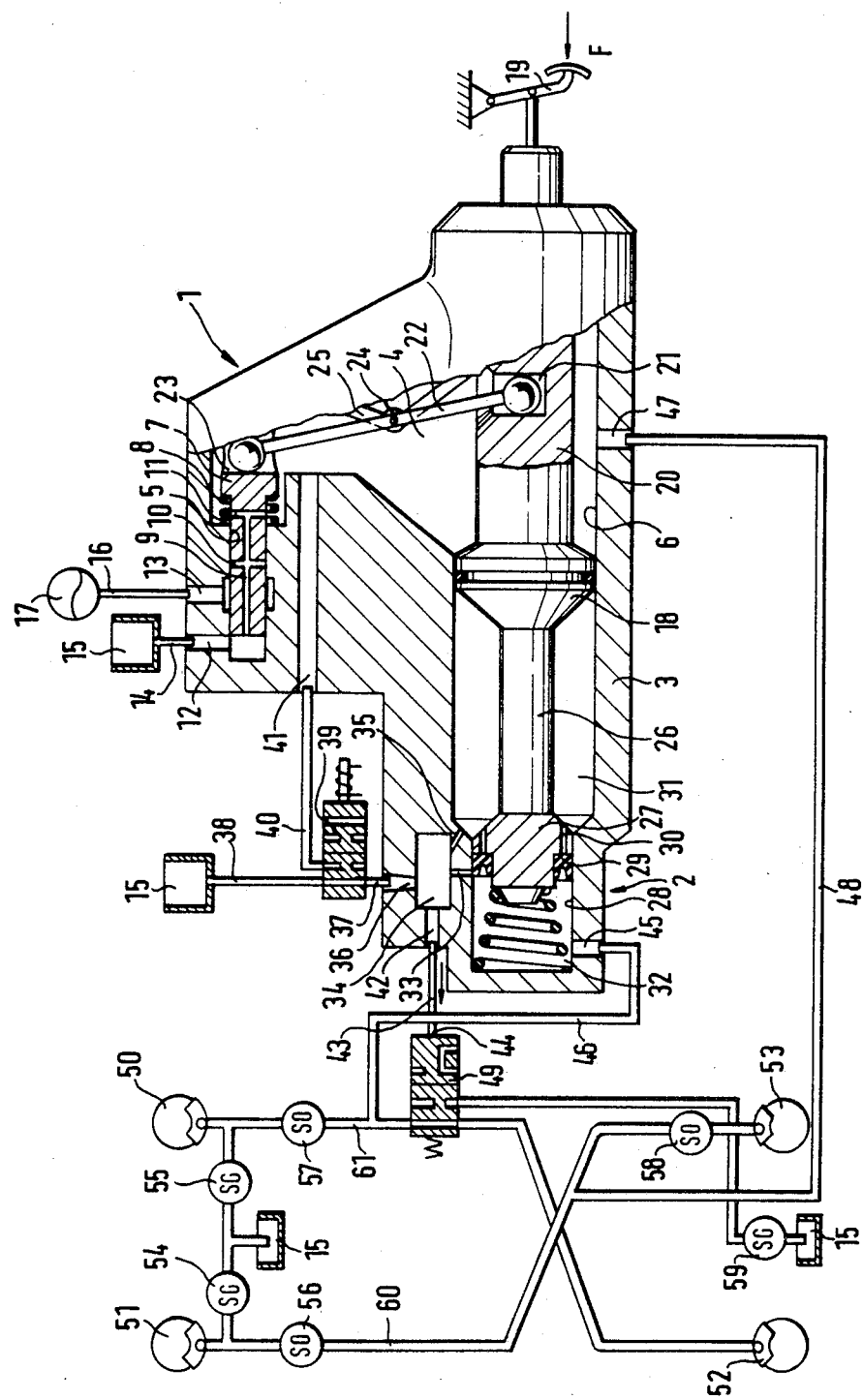

HYDRAULIC BRAKE SYSTEM

BACKGROUND OF THE INVENTION

This invention relates to a hydraulic brake system for automotive vehicles with a master cylinder and with a hydraulic power booster connected upstream of the master cylinder and having a pressure chamber in which an auxiliary pressure depending on the actuating force may be modulated via a pedal-operable brake valve, with wheel brakes of a first brake circuit being connected at the pressure chamber and with wheel brakes of a second brake circuit being connected at the master cylinder, in which wheel brakes the braking pressure is additionally influenceable by valve means controllable in dependent on the slip, and in case of control a hydraulic communication being established between the pressure chamber of the hydraulic power booster and the master cylinder.

A device featuring the above characteristics is disclosed in the prior German patent application No. P 32 32 051.5. The brake system according to the prior suggestion substantially comprises a hydraulic power booster wherein two bores are arranged in parallel with each other. One of the cylinder bores accommodates the control slide of a brake valve. Via a lever actuation in dependence on the actuated force applied to the brake pedal, by means of said control slide it is possible to adapt and supply a hydraulic pressure to be metered into the pressure chamber of the hydraulic power booster. The pressure chamber of the hydraulic power booster is confined by a booster piston mechanically coupled with a master cylinder. Via valve means operable in dependence on the slip, a connection is established between the pressure chamber of the hydraulic power booster and a first brake circuit, thus the wheel brakes of this brake circuit being dynamically pressurizable. The master cylinder connected downstream of the hydraulic power booster is a tandem master cylinder with two working chambers pressurizable by the hydraulic power booster, on account of the interposition of the respective valve means operable in dependence on the slip each time a further brake circuit being pressurizable. The master cylinder further has a so-called prechamber. In dependence on the control signals of slip electronics, further valve means may connect said prechamber with the pressure chamber of the hydraulic power booster.

If in the described brake system an actuating force is exerted on the brake pedal there will be a corresponding displacement of the control slide of the brake valve. Thus, finally pressure medium of an auxiliary pressure source will flow into the pressure chamber of the hydraulic power booster. On the one hand, said pressure medium will effect a displacement of the booster piston in the direction of actuation. On the other hand, it will reach the wheel brakes of one brake circuit. Due to the displacement of the booster piston a hydraulic pressure will likewise build up in the working chambers of the master cylinder by means of which pressure the two other brake circuits will be pressurized. If slip control electronics monitoring the rotational behavior of the wheels detect unfavorable slip values at one or several vehicle wheel(s) the valve means inserted into the brake circuits will be switched over so as to reduce the braking pressure until a reacceleration of the respective wheel(s). At the same time, the prechamber of the tandem master cylinder will be pressurized. Thus, if required, the pressure medium tapped from the wheel brakes will also be replaced from the dynamic brake circuit.

From the above there results in the brake system according to the prior art a so-called Y-allotment of the brake circuits had been chosen in which, according to a certain selection procedure, the wheel brakes of the rear axle are jointly controlled via valve means operable in dependence on the slip while each one of the wheel brakes provided at the front axle is connected to one working chamber of the tandem master cylinder, thus an individual wheel control being possible at the front axle of the automotive vehicle.

In the prior art German patent application No. P32 47 498.9, on the other hand, it is disclosed that a first brake circuit is connected at the pressure chamber of a hydraulic power booster while a second brake circuit likewise comprising two wheel brakes is connected at the working chamber of a master cylinder. The arrangement of the wheel brakes at the vehicle theoretically may be effected in any way. For safety reasons and because of practical considerations, however, it has provide expedient to either arrange the wheel brakes of one brake circuit at one vehicle axle at a time or, on the other hand, to arrange the wheel brakes of each brake circuit at the vehicle so that they will diagonally oppose each other. If the wheel brakes of the brake circuits, e.g., are arranged at the vehicle so as to diagonally oppose each other a joint braking pressure control will not easily be possible in the wheel brakes of one vehicle axle. Thus, as a rule, there must be an individual wheel control of the automotive vehicle, thereby the number of the braking pressure control units increasing as compared with the brake system described before. If namely in case of a diagonal brake circuit allotment an individual wheel control of the automotive vehicle is to be realized it will be necessary to associate each wheel brake with corresponding valve means. As a rule, each valve means consists of an electromagnetically operable valve which is open when de-energized and which in the case of normal braking actions establishes a communication between the brake pressure source and the respective wheel brake. A further component of the valve means is a solenoid valve closed during normal braking actions and establishing a hydraulic communication between the wheel brake and an upressurized return reservoir upon a corresponding actuation by slip control electronics. In such a pressure reduction phase, the valve which is open when de-energized will be kept in a closed position. Thus, altogether, eight electromagnetically operable valves will be required if a diagonal brake circuit allotment is demanded in a brake system with slip control and if the pressure supply to one brake diagonal shall be dynamic and the pressure supply to the other diagonal shall be static.

It is thus an object of the present invention to reduce the number of the solenoid valves required in a hydraulic brake system in the presence of such demands.

SUMMARY OF THE INVENTION

According to this invention this object is solved in that a valve device is provided which may be switched over in case of control and by means of which the two wheel brakes of one axle may be connected with each other, the wheel brakes of one brake circuit each being arranged at the vehicle such as to diagonally oppose each other. Such an embodiment is based on the consideration that in the case of normal braking actions, i.e. without slip control, the solenoid valves will adopt their basic positions, thus not having any effect on the braking behavior of the vehicle. Further, the brake experts know that, due to the dynamic axle load distribution, the major part of the braking performances will be rendered by the wheel brakes at the front axle. It is further known that a slip control at the wheel brakes of the front axle of an automotive vehicle will contribute to the maintenance of the steerability of the vehicle while the rear wheels of an automotive vehicle, below critical slip values, will guarantee the directional stability. Consequently, with regard to the subject matter of the application, there results that in case of slip control the diagonal or X-allotment brake circuit allotment will be switched over to a Y-allotment. Thereby, only a negligible loss in the braking performance will result. This, however, is contrasted by a saving of two solenoid valves. In this connection, it is particularly advantageous that the wheel brakes connectible with each other upon an actuation of the valve device are arranged at the rear axle of the vehicle. If one uses the so-called 'select-low method' at this rear axle, even in case of control, the inventive brake arrangement will guarantee that the two rear wheels will remain below critical slip values and thus will guarantee the directional stability of the vehicle. In an advantageous embodiment of the subject matter of the application it is further provided that the rear axle wheel brake normally connected at the master cylinder will be separated from the diagonally opposite wheel brake after the switching-over of the valve device. In such an embodiment it is ensured that the two rear axle wheel brakes dynamically pressurized in case of control will have a connection to the working chamber of the master cylinder, thus, possibly undesirable reactions on the brake pedal being avoided. By contrast thereto, however, it is also conceivable to pass the dynamic braking pressure into the working chamber of the master cylinder, thus the actuating force exerted on the brake pedal being counteracted by a corresponding force which will prevent the master cylinder piston from travelling an unduly large distance in the direction of actuation.

An advantageous further development of the subject matter of the application provides that the valve device is controllable by a hydraulic pressure. In such an embodiment the valve device may be designed as low-cost hydraulic valve which experience proves to be more favorable with regard to costs than a corresponding electromagnetically actuatable valve. Further, an electric feed line to the valve device may be dispensed with. Advantageously, upon a supply of pressure medium from the pressure chamber of the hydraulic power booster, the valve device will be switched from a first into a second position. The valve device is connected at a prechamber which normally is communicating with an unpressurized supply reservoir and which in case of control is pressurizable by the pressure of the pressure chamber of the hydraulic power booster. In case of control, the prechamber which is part of the master cylinder and which is hydraulically communicating with an unpressurized supply reservoir both in the brake's release condition and in the case of normal braking actions will be pressurized by the pressure prevailing in the booster chamber via a corresponding switchover valve. Thereby, the valve device operable in dependence on the pressure will immediately come into a second operating position, the connection between the wheel brakes arranged at the rear axle of the automotive vehicle being brought about. If it is to be excluded that the dynamic pressure medium now adapted to be metered into the two rear axle wheel brakes will come to the working chamber of the master cylinder it will be expedient that the valve device will be operable in such a manner as to ensure that the connection between the respective wheel brakes will not be brought about until after the separation of the master cylinder. Such an effect may easily be achieved by a corresponding channel design within the hydraulic valve device.

BRIEF DESCRIPTION OF THE DRAWING

One example of an embodiment of this invention will be explained in more detail in the following, reference being made to the drawing wherein the single FIGURE illustrates a hydraulic brake system including a master cylinder and a hydraulic power booster connected upstream of the master cylinder.

DETAILED DESCRIPTION

In the FIGURE, the reference numeral 1 marks a hydraulic power booster. A master cylinder 2 is connected downstream thereof, the units 1 and 2 being accommodated in a housing 3. The hydraulic power booster 1 has a pressure chamber 4 from which two cylinder bores 5, 6 are emanating which are arranged in parallel with each other. In the cylinder bore 5 a control slide 7 is guided. Said control slide 7 is sealed automatically, being preloaded by a compression spring 8 so as to adopt a right-hand end position as seen in the drawing and having an axial channel 9 as well as radial channels 10, 11. Further, pressure channels 12, 13 are ending in said cylinder bore 5 of the hydraulic power booster 1, the pressure channel 12 communicating with an unpressurized supply reservoir 15 via a pressure line 14 and the pressure channel 13 hydraulically communicating with a pressure accumulator 17 via a pressure line 16. In the brake arrangement's rest position discernible from the drawing, the control slide 7 of the hydraulic power booster 1 adopts an axial position in which the unpressurized supply reservoir 15 is communicating with the pressure chamber 4 via the pressure line 14, the pressure channel 12, the axial channel 9, and the radial channel 11.

Sealed, a booster piston 18 is guided in the cylinder bore 6, said booster piston 18 having an extension 20 close to the brake pedal 19. In said extension 20, a recess 21 is arranged. The recess 21 accommodates one end of a lever 22 whose other end engages a recess 23 of the control slide 7. The ends of the lever 22 are designed in a way which, in respect of the axes of the control slide 7 and of the extension 20, will allow but very limited movements within the recesses 21, 23 arranged respectively in the extension 20 of the booster piston 18 and in the control slide 7.

Via a hinge joint 24, a further lever 25 is supported at the lever 22. The lever's 25 upper end is supported stationarily within the housing 3. The lower end of the lever 25 likewise not illustrated is supported in a push rod which upon the application of a force via the brake pedal 19 will carry out a relative movement with respect to the booster piston 18 or its extension 20, respectively.

The booster piston 18 is connected with a master cylinder piston 27 via a web 26, the master cylinder piston 27 having a smaller diameter than the booster piston 18 and being guided within a master cylinder bore 28. At the pedal-remote side, the master cylinder piston 27 has a sleeve seal 29. From the back of said sleeve seal 29, pressure medium channels 30 lead to an annular chamber 31, which, on its part, is formed by the web 26, the booster piston 18, the master cylinder piston 27, and the housing 3. Together with the housing, the master cylinder piston 27 confines a working chamber 32. Via the sleeve seal 29 acting as check valve, said working chamber 32 may be opened in case of a pressure drop from the annular chamber 31 towards the working chamber 32. In the direction of actuation, in front of the sleeve seal 29, an expansion bore 33 ends in the master cylinder bore 28. Said expansion bore 33 communicates with a prechamber 34. Moreover, the prechamber 34 is hydraulically communicating with the annular chamber 31 via a passage 35. In the brake's release position discernible from the drawing, the prechamber 34 is communicating with the unpressurized supply reservoir 15 via a housing channel 36 and pressure lines 37, 38, an electromagmetically operable 2/2-way valve being interposed. The electromagnetically operable 2/2-way valve is designed such as to come into a switch position upon excitation of the magnet coil and, in said position communication being interrupted between the unpressurized supply reservoir 15 and the prechamber 34. In such a switch position of the directional valve 39 by contrast thereto there exists a communication between the pressure line 37 and a pressure line 40 communicating with the booster chamber 4 of the hydraulic power booster via a housing channel 41.

Via a pressure line 43, a further housing channel 42 is communicating with the control port 44 of a 3/2-way valve which is operable in dependence on the pressure. Further, a housing part 45 is ending in the working chamber 32 of the master cylinder 2. Via a pressure line 46, said housing port 45 communicates with the brake system of an automotive vehicle. A further housing port 47 ends in the booster chamber 4 of the hydraulic power booster 1. Via the pressure line 48, said housing port 47 likewise hydraulically communicates with the brake system of the automotive vehicle.

In the left part of the drawing, the brake system of the automotive vehicle is illustrated purely schematically and has wheel brakes 50, 51, 52, 53. The wheel brakes 50, 51 are arranged at the front axle of the automotive vehicle whereas the wheel brakes 52, 53 are arranged at the rear axle of the automotive vehicle, the wheel brake 53 lying diagonally opposite to wheel brake 51. A second brake diagonal is formed by the wheel brakes 50, 52. The wheel brakes 51, 53 and 50, 52 form the diagonally opposed or X-like distribution circuits. Electromagnetically operable valves 54, 55 are connected at the wheel brakes 50, 51. In the de-energized state, said valves 54, 55 are closed, thus interrupting a connection towards the unpressurized supply reservoir 15. Two solenoid valves 56, 58 being interposed, the wheel brake 51 is communicating with the wheel brake 53. Connected at the wheel brake 50 further is a solenoid valve 57. Unexcited, said valve 57 will establish a hydraulic communication towards the wheel brake 52 via the 3/2-way valve. The solenoid valves 56, 57, 58 are designed such as to form a hydraulic passage when unexcited. Connected at the wheel brake 53 is a further solenoid valve 59 wherein the wheel brake 53 may be relieved towards the unpressurized supply reservoir 15. Moreover, the wheel brake 53 hydraulically communicates with the 3/2-way valve 49.

The pressure line 48 connected at the pressure chamber 4 of the hydraulic power booster 1 ends in a pressure line 60 between the electromagnetically operable valves 56, 58. The pressure line 46, on the other hand, is connected at a connection line 61 connecting the electromagnetically operable valve 57 and the 3/2-way valve 49 with each other. All the electromagnetically operable valves 39 and 54 through 59 are controllable by non-illustrated slip control electronics by means of which in cooperation with sensors arranged at the vehicle wheels the rotational behavior of the vehicle wheels is determined.

In the following, the mode of operation of the described brake system will be explained in more detail, proceeding from the brake's release position in which no actuating force F is exerted on the brake pedal 19 and in which all the moving parts of the brake system have adopted their positions discernible from the drawing. The electromagnetically operable valves 39, 54 through 59 likewise have adopted their best positions. An actuating force F being applied to the brake pedal 19, the control slide 7 will be caused by the actuation of the levers 22, 25 to at first adopt an axial position in which the pressure channel 12 will be closed and thus the connection will be interrupted between the unpressurized supply reservoir 15 and the pressure chamber 4 of the hydraulic power booster 1. Upon an increase of the actuating force F acting on the brake pedal 19 the radial channel 10 and the housing channel 13 will register. Thus, via the pressure line 16 and the channels 9, 11 within the control slide 7, pressure medium will flow from the pressure accumulator 17 into the booster chamber 4. The pressure thus building up in the booster chamber 4 of the hydraulic power booster 1 will directly reach the wheel brakes 51, 53 via the housing port 47 and the pressure line 48. Further, the pressure in the booster chamber 4 will pressurize the booster piston 18. After overcoming the friction of the seals, said booster piston 18 will be caused by a certain pressure level in the booster chamber 4 to move in the direction of actuation and to carry the master cylinder piston 27 along. Thereby at first the expansion bore 33 will be overridden by the sleeve seal 29, thus the working chamber 32 of the master cylinder 2 will be separated from the unpressurized supply reservoir 15. Upon a further displacement of the booster piston 18 and of the master cylinder piston 27, respectively, a pressure build-up will take place in the working chamber 32 which will be supplied to the wheel brakes 50, 52 via the housing port 45 and the pressure line 46.

If the actuating force F exerted on the brake pedal 19 now is increased that much that the slip control electronics will detect critical slip values at one or several of the vehicle wheels, at first the pressure supply to the wheel brakes 51, 50, 53 will be interrupted by the switching-over of one or several of the electromagnetically operable valves 56, 57, 58. Should such a limitation of the pressure supply not be sufficient to cause a reacceleration of the vehicle wheel(s), the respective electromagnetically operable valves 54, 55, 59 will be actuated, thus pressure medium being tapped from the wheel brakes.

Upon the detection of critical slip values the 2/2-way valve 39 will simultaneously be excited. Thereby, at first a communication will be interrupted between the unpressurized supply reservoir 15 and the prechamber 34 of the master cylinder 2. Thereupon, via the housing channel 41, the pressure line 40, the valve 39, the pressure line 37, and the housing channel 36, a hydraulic communication will be established between the pressure chamber 4 and the prechamber 34. The pressure now prevailing in the prechamber 34 will reach the control port 44 of the 3/2-way valve 49 via the pressure line 43. Thus said valve 49 will come into an actuating position. In said actuating position of the directional valve 49, the wheel brakes 52, 53 will be connected with each other. Thus a joint pressure control will be possible in said wheel brakes 52, 53, the pressure control being effected by a suitable actuation of the solenoid valves 58, 59.

The dynamic pressure prevailing in the prechamber 34 further will enter the annular chamber 31 via the passage 35. If there is a pressure difference at the sleeve seal 29 said pressure will pass from the annular chamber 31 through the pressure medium channels 30 into the working chamber 32 of the master cylinder. Thus pressure medium tapped from the wheel brake during a pressure reduction phase will be replaced in this way.

Upon a failure of the pressure accumulator 17, the diagonally opposite wheel brakes 50, 52 may be pressurized only by mechanical action on the brake pedal. In such an emergency the slip control electronics will ensure that all the electromagnetically operable valves 39, 54 through 59 will remain in their rest positions. The valve 49 likewise will not switch over in such an emergency as no pressure can be generated in the prechamber 34 or at the control port 44 of the valve, respectively. The master cylinder piston will be displaced only by the actuating force F in the brake's direction of actuation. Thus, after the overriding of the expansion bore 33, a hydraulic pressure will build up in the working chamber 32. Said pressure will pressurize the wheel brakes 50, 52. By suitably rating the master cylinder 2, the pressure which thus may be generated in the wheel brakes 50, 52 will easily be strong enough to ensure that there will ensue a prescribed minimum slowing down of the vehicle.

What is claimed is:

1. A hydraulic brake system for automotive vehicles, said system comprising:

a hydraulic power booster connected with a master cylinder; said booster including a pressure chamber;

a pedal actuated brake valve modulating an auxiliary fluid pressure in said pressure chamber in correlation with a force applied to a brake pedal;

wheel brakes comprising a first circuit and being connected with said pressure chamber;

wheel brakes further comprising a second circuit and being connected with said master cylinder;

valve means controlling a fluid flow to each wheel brake in correlation with a wheel brake slip;

said valve means including a device regulating a fluid flow distribution to said circuits;

said valve means hydraulically connecting said pressure chamber with said master cylinder;

wheel brakes of each of said circuits being diagonally opposed and said circuits forming an X-like pattern of fluid distribution during regular brake operation;

a pair of wheel brakes connected to one axle and coupled with respective circuits during regular brake operation; said device redistributing fluid flow in a Y-like pattern during a brake slip control operation of said brake system and interconnecting said pair of wheel brakes.

2. A hydraulic brake system as claimed in claim 1, wherein said axle is a rear axle and said valve device blocks fluid flow between one rear axle wheel brake and said master cylinder.

3. A hydraulic brake system as claimed in claim 1, wherein the valve device switches said flow distribution from said X-like pattern to said Y-like pattern upon introduction thereinto of a pressurized fluid from the pressure chamber (4) of the hydraulic power booster (1).

4. A hydraulic brake system as claimed in claim 3, wherein the valve device (49) is connected to a prechamber (34) communicating with an unpressurized supply reservoir (15) and said prechamber is pressurizable by the pressure of the pressure chamber (4) of the hydraulic power booster (1).

5. A hydraulic brake system as claimed in claim 3, wherein the valve device (49) is able to connect the pair of wheel brakes (52, 53) after blocking a fluid flow from the master cylinder (2).

* * * * *